Figure 3:
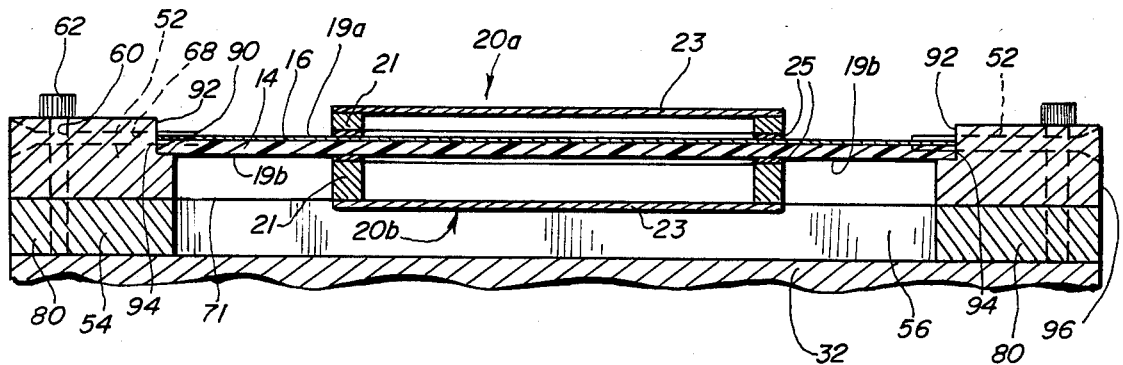

United States Patent [19]

Van Benschoten

[11] Patent Number: 4,557,568

[45] Date of Patent: Dec. 10, 1985

[54] GUIDE RAIL APPARATUS FOR POSITIONING FLAT OBJECTS FOR MICROSCOPIC EXAMINATION

[75] Inventor: Peter J. Van Benschoten, Rancho Santa Fe, Calif.

[73] Assignee: The Micromanipulator Microscope Company, Inc., Escondido, Calif.

[21] Appl. No.: 572,932

[22] Filed: Jan. 23, 1984

[51] Int. Cl.⁴ .............................................. G02B 21/26
[52] U.S. Cl. ..................................... 350/531; 108/143
[58] Field of Search ................. 350/531, 529; 108/143

[56] References Cited

U.S. PATENT DOCUMENTS

| | | | |
|---|---|---|---|
| 2,869,418 | 11/1959 | Miller et al. | 350/529 |
| 3,765,745 | 10/1973 | Burboeck | 350/531 |
| 3,862,793 | 1/1975 | Gallant | 350/529 |
| 4,011,004 | 3/1977 | Levine et al. | 350/531 |
| 4,012,111 | 3/1977 | Masterson | 350/529 |

*Primary Examiner*—Jon W. Henry
*Attorney, Agent, or Firm*—Fitch, Even, Tabin & Flannery

[57] ABSTRACT

A work station for photomask inspection includes a microscope and a movable stage positioned below the objective of the microscope. A rectangular frame of the stage surrounds a viewable area of the stage. Rail means are bolted onto the frame at spaced apart positions corresponding to the width of the photomask that is to be inspected so as to position the photomask therebetween. The rails have end stops that are positionable according to the length of the photomask for positioning the end edges of the photomask therebetween.

7 Claims, 4 Drawing Figures

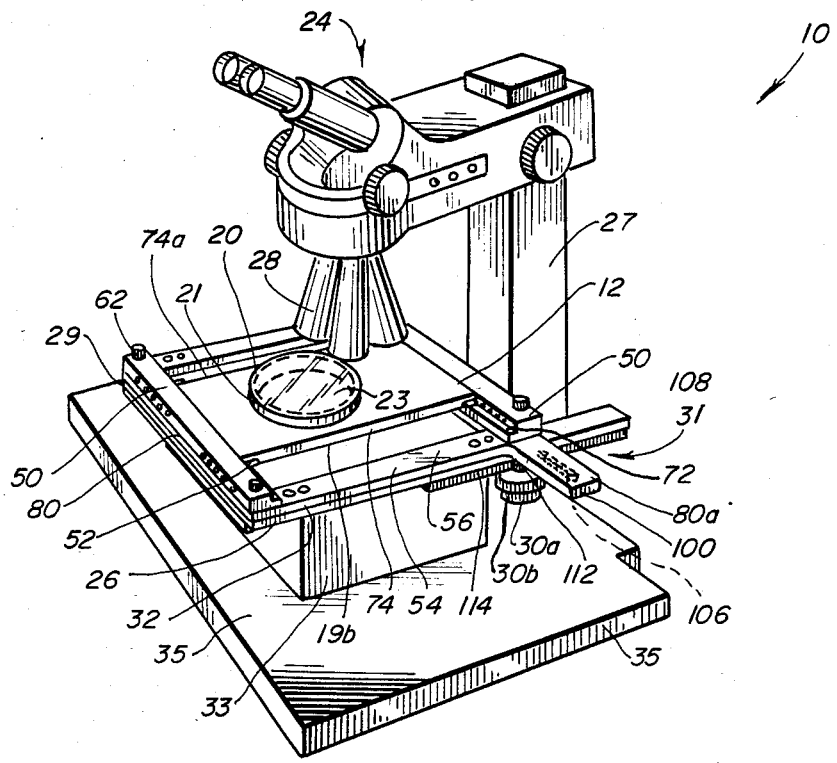
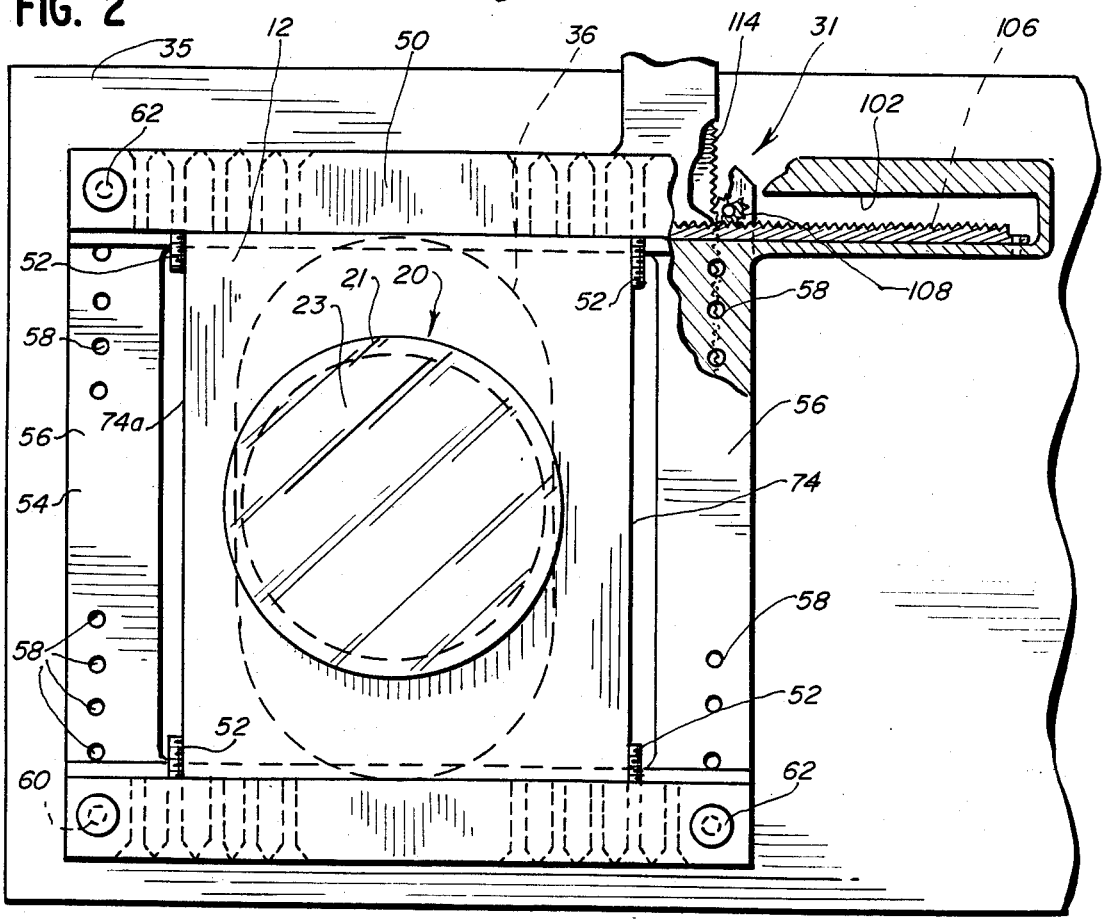

GUIDE RAIL APPARATUS FOR POSITIONING FLAT OBJECTS FOR MICROSCOPIC EXAMINATION

The present invention relates to microscopic inspection of flat objects and more particularly to an improved means for positioning flat delicate objects in front of the objective of the microscope.

The present invention is an improvement on apparatus which is currently used for positioning flat, delicate objects in front of the objective of a microscope and in particular to apparatus for inspecting photomasks that are used for forming integrated circuits by a microlithography technique.

The microlithography technique is similar to photography except that glass coated with etched chrome, called a photomask, serves as the negative from which the integrated circuit is printed. The negative or photomask is formed from a photomask blank comprising a glass plate covered on one surface with a layer of chromium, which is, in turn, covered with a photo-resist layer. The resist of the blank is exposed to a focused geometric light pattern, creating a photochemical change in the exposed area. The exposed blank is then subjected to a developing solution that removes exposed resist, and the blank is then exposed to an acid solution which removes the underlying chromium in the regions where the resist has been removed, thereby etching the geometric pattern into the chromium. Relatively recently, it has become common practice to protect the developed photomask from dust by packaging the photomask as a unit with at least its etched surface and frequently both surfaces protected by a "pellicle". The pellicle consists of a frame and a membrane of transparent material, such as nitrocellulose or a PEHB, stretched across the frame to overlie the etched surface, spaced therefrom by about 3-6 mm.

The pellicle-protected photomask is then used for projecting the geometric pattern onto a silicon wafer that is coated with a thin layer or membrane of photoresist. By a multi-step process, the exposure pattern is developed into an integrated circuit of the precise projected geometric pattern.

The developed photomask contains much minute detail, and functioning of the integrated circuit requires precise transfer of the geometric pattern to the developed photomask. Photomasks are therefore inspected under a microscope several times, both before and after development. When the photomask is inspected prior to exposure, light of wavelengths to which the resist is insensitive is used.

As a means of aligning the photomask below the objective of a microscope, it is known to provide a movable stage on which the photomask is positioned. The stage has adjustment means for moving the stage in both the X and Y axes, i.e., end-to-end and forward and rearward. As a means for placing the photomask on the stage without damaging the photomask, a system has been developed in which the photomask is placed within a central window of a paddle and edge portions of the paddle are slid along the rails carried on a movable stage to align the photomask below the microscope objective.

Photomasks for various purposes come in a variety of sizes. In a system having parallel rails mounted to the stage adapted to receive a photomask paddle of particular dimensions, a series of photomask paddles having various size windows must be provided for accommodating the various sizes of photomasks. Because microscopic inspection requires precise alignment of the observed photomask in a plane perpendicular to the light path, the photomask paddles are each machined to within very close tolerances, and therefore, are each relatively expensive. Multiplicity of such paddles can add substantially to the expense of a photomask inspection station. Furthermore, paddles are inconvenient in that if a paddle is not available with a window matched to the photomask to be inspected, the photomask cannot be inspected. Also, paddles are removable accessories to the photomask inspection station and may be easily misplaced, causing inconvenience to the operator who expects a full complement of photomask paddles to be available.

It is a primary objective of the invention to provide a photomask inspection station which accommodates a size range of photomasks without using photomask paddles that are individually manufactured to hold each size of photomask and to handle photomasks protected by pellicles.

A photomask inspection station includes a microscope and a horizontal stage having means for moving a photomask placed thereon in an end-to-end direction as well as in the forward and rearward direction to successively position all portions of the photomask that require inspection below the microscope objective. The stage includes a frame member that surrounds a viewable area, and mounted on top of the frame is a pair of guide rails with horizontal surfaces for directly supporting a rectangular photomask below the objective and lateral guiding edge surfaces between which lateral edge surfaces of the photomask are closely positioned. Means are provided for changing the position of the guide rails on the frame to adjust the distance between the guiding edge surfaces according to the distance between the lateral edge surfaces of the photomask, thereby permitting photomasks of various widths to be laterally positioned by the rails. End stop means carried by the rails are similarly adjustable for closely positioning end edges of the rectangular photomask therebetween. The guide rails are positioned relative to the stage to accommodate a pellicle below the photomask and above the stage.

These and other objects and advantages of the invention will now be decribed in greater detail with reference to the drawing in which FIG. 1 is a perspective view of a photomask inspection station including a microscope, a movable stage embodying various features of the present invention disposed below the objective of the microscope and a photomask positioned on the stage;

FIG. 2 is a plan view of a photomask positioned by the guide rails;

FIG. 3 in a cross-sectional view taken along FIG. 3—3 of FIG. 2; and

Figure 4:
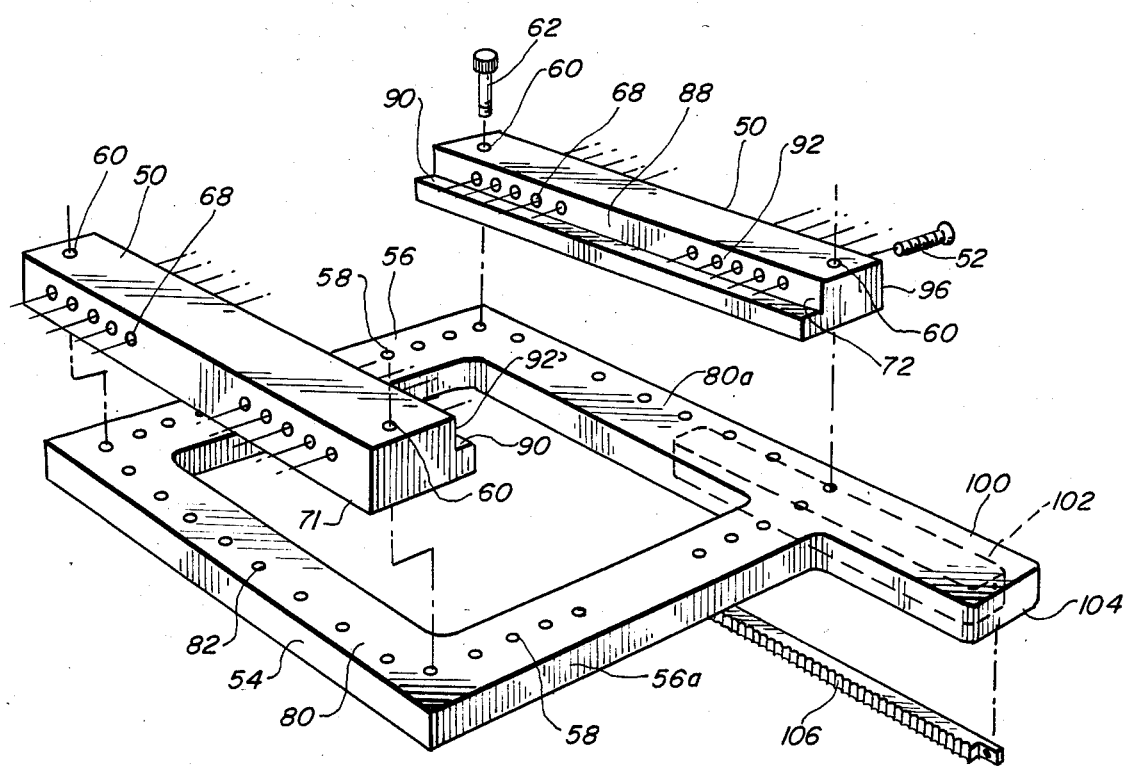

FIG. 4 is a perspective assembly view of the frame and guide rails.

Illustrated in FIG. 1 is a perspective view of a work station 10 which is used for examining photomasks 12, each including a glass plate 14 (FIG. 3) and a thin etched metal coating 16. The surface 19a of the photomask 12 that is covered with the metal coating 16 is protected with a pellicle 20a and the rear glass surface 19b of the photomask 12 is likewise protected with another pellicle 20b. Each pellicle 20 comprises a cylindrical metal (e.g., aluminum) frame 21 over which a transparent membrane 23 is stretched. The pellicle 20 is bonded to the photomask with double-sided adhesive tape 25 so that each membrane 23 is spaced between about 3 to 6 mm. above the respective surface 19. It is particularly important that the pellicle membranes 23 not be damaged during the inspection.

The work station 10 includes a microscope 24 and a stage 26 disposed below the objective 28 of the microscope on which the photomask 12 is positioned for inspection. The microscope 24 may be a stereomicroscope or a compound microscope with a long (6 mm) working distance objective.

The stage 26 includes a lower support plate 35; a housing 33; a stationary base plate 29 disposed on top of the housing, a flat horizontal plate 32 that is mounted on top of the base plate by means (not shown) for sliding forward and rearward relative to the base plate; a frame 54 that is mounted on top of the flat plate by rail means (not shown) for sliding from end to end relative thereto; and a pair of guide rails 50 affixed to the frame for supporting and aligning a photomask 12. The housing 33 contains electrical apparatus for adjusting the intensities of illuminators (not shown) which are mounted to shine through a circular opening (not shown) in the base plate 29 and an elongated window 36 (FIG. 2) of the flat plate 32 that provides an unobstructed illumination path from the circular opening of the base plate throughout forward and rearward travel of the flat plate. With a rack and pinion movement mechanism, indicated generally at 31, a technician turns knobs 30b, 30a to slide the flat plate 32 forward and rearward and the frame 54 end to end to successively position all portions of the photomask 12 that must be inspected below the objective 28.

Heretofore, the photomask 12 with, or without pellicles 20a or 20b, was loaded into a paddle (not shown) and the forward edge of the paddle was then aligned to slide into a slidway carried on rails secured to the stage at fixed locations thereon. The photomasks typically varied in sizes from two inches to five inches in width and the size of the aperture in a given paddle was likewise made to accommodate but a single size of photomasks. Thus, for example, each of the respective paddles had openings of two, three, four or five inches to receive a similarly sized photomask, and all of the paddles had the same width to fit into the dovetail slidway grooves in a pair of rails. Thus, the photomasks had to be loaded into the paddles and then the paddles had to be carefully handled and slid into the dovetailed slideways on the rails while taking care not to damage the pellicles and/or photomasks.

In accordance with the present invention, the paddles are eliminated and a photomask 12 with or without pellicles 20a and 20b may be loaded directly onto the rails 50 without a sliding thereof at a position aligned beneath the objective 28 by suitable stop means 52 associated with the rails 50. The photomask 12 may be deposited downwardly in a vertical direction directly onto horizontally extending ledge surfaces 90 which project toward each other and have a lesser dimension than that of the photomask so that opposite edges of the photomask may rest thereon. Upstanding walls on the rails are spaced apart by the distance normally associated with the width of the photomask. The preferred stop means 52 includes inwardly projecting threaded fasteners 52 which are selectively located depending on the size of the photomasks and threaded into the rails at one of a plurality of threaded openings 68 in the rails 50. The rails also may be shifted fore and aft relative to the line of sight of the microscope and to the center of the stage frame 54 and secured at portions associated with the size of the photomask by threaded fasteners 62 which may be threaded into one of a plurality of threaded holes 58 in the stage base frame 54. Thus, the rails 50 may be adjusted in one direction and the stop means adjusted in the other orthogonal direction to provide X and Y axes alignment of the photomask on the stage for a number of different sizes of photomasks.

More specifically, as a means of adjusting the spacing between the guide rails 50, end beams 56 of the frame have a series of opposed threaded holes 58; the guide rails 50 each have a pair of end holes 60 (FIG. 4) spaced apart to align with a selected pair of opposed frame holes 58; and threaded fasteners, e.g., bolts 62, extend through the rail holes 60 and are screwed into the end beam holes 58 of the frame to affix each rail 50 to one of the series of end beam hole pairs 58. As a means of positioning the rectangular photomask 12 in the end-to-end direction that the rails 50 run, a series of opposed threaded holes 68 extend horizontally through the rails, and threaded stop members 52 extend through the threaded holes and into photomask seating region 72 to position the end edges 74 of the photomask therebetween. When a photomask 12 of a different size is to be inspected, the guide rails 50 are bolted to different pairs of opposed frame holes 58, and the threaded stops 52 are moved to different pairs of opposed horizontal holes 68 in the guide rails.

In the illustrated embodiment the rails 50 run from end to end, one positioned at the front of the stage 26 with respect to the operator and one positioned at the rear of the stage with respect to the operator. Of course, the apparatus could be modified so that the rails would run in a front to rear direction.

The frame 54 not only provides for spacing the rails 50 relative to each other, but vertically positions the rails above the flat plate 32. This vertical spacing is necessary to protect the pellicle 20 when the photomask is inspected with a surface-protecting pellicle 20 extending downward to below the level of the bottom surfaces 71 of the rails 50 as is shown in FIG. 3. The illustrated rectangular frame 54 includes the end beam 56 and lateral side beams 80. Vertical holes 82 are formed in lateral side beams 80 by which the frame is attached with threaded fasteners to the slide means (not shown) on which the frame is mounted from the flat plate 32. The illustrated end beams 56 have five pairs of opposed threaded holes in front and five pairs of threaded holes in back, providing for five relative centered positions of the front rail and rear rail. Of course, any number of hole pairs could be provided.

The illustrated rails 50, as seen in FIG. 4, have generally rectangular cross sections except for indentations 88 along their upper inside (facing) corners. The indentations 88 provide the seating regions 72 that include horizontal ledge surfaces 90 on which the bottom surface 19b (FIG. 3) of the photomask plate 14 rests and vertical lateral surfaces 92 between which the lateral edge surfaces 94 of the photomask plate fit closely. The horizontal threaded holes 68 extend from the outside edges 96 of the rails 50 opening into the lateral edge surfaces 92 of the indentations 88, and the threaded members 52 are of sufficient length to extend into the seating region 72 and serve as stops for the end edges 74 of the photomask 12.

After the relative positions of the rails 50 are set by proper selection of opposed holes 58 in the frame 54 and the relative positions of the stops 52 are set according to the length of the photomask, the photomask 12 is seated on the rails. This may be accomplished by inserting the photomask into the seating region 72 at a slight angle so that a leading end edge 74a is positioned on the horizontal ledge surfaces 90 just short of one of the pairs of end stops 52, then sliding the photomask 12 until its leading end edge contacts the end stops, and allowing the other end of the photomask to drop into position along the other set of end stops. In this manner, the photomask 12 is placed on the stage 26 without the pellicle 20 abutting any potentially damaging surfaces.

In the illustrated embodiment, the rack and pinion mechanism 31 by which the photomask is moved both laterally and in an end to end direction is associated with the frame 54 and with the base plate 29. The rear beam 80a of the frame has an extending portion 100 and an elongated groove 102 is formed in the lower surface 104 of the rear beam extending through the extension as well as inward of the right-hand end beam 56a. The rack 106 by which the frame 54 is moved in an end-to-end direction is affixed within this groove 102 and is moved by a pinion 108 (FIG. 1) that is controlled by one of the adjustment knobs 30a. The flat plate 32 is slid forward and rearward relative to the base plate 29 by means of another pinion 112 which engages a rack 114 that is affixed to the base plate and which is controlled by the other knob 30b.

Because the relative positions of the rails are set by threaded fasteners and the end stops likewise screwed into position, there is no shifting of the relative positions of the rails and stops as numerous successive photomasks are positioned for inspected at the station. By providing apparatus that is secured to the stage and which is adjustable for accommodating photomasks of various sizes, the invention eliminates the need for paddles which are conventionally used to position photomasks over a stage for microscopic inspection. Eliminating the need for paddles not only eliminates the expense of manufacturing the individual paddles but eliminates the inconvenience of not having a paddle with an appropriate window size available and eliminates the frustration of paddle misplacement.

While the invention has been described in terms of a preferred embodiment, modifications obvious to one with ordinary skill in the art may be made without departing from the scope of the present invention. For example, while the rails are positioned relative to each other by bolting them to the frame, track means might be provided for sliding the rails along the frame toward and away from each other, and the stop means may be fastened directly to the base plate of the stage or may be mounted for sliding movement along the rails or stage base plate.

Various features of the invention are set forth in the following claims.

What is claimed is:

1. A photomask inspection station comprising
a microscope having an objective and a predetermined line of sight,
a stage positioned below the microscope objective,
said stage having a pair of spaced guide rail means each having surfaces for supporting a photomask and laterally positioning the photomask below the objective of the microscope,
means for adjusting the relative spacing of the guide rails, and
stop means associated with the guide rail means for positioning opposite end edges of the photomask therebetween and locating the photomask in the line of sight of the microscope.

2. An inspection station according to claim 1 wherein said stage includes a flat plate including a viewable area, a frame secured to said flat plate surrounding said viewable area, and said guide rails affixed on top of said frame.

3. An inspection station according to claim 2 wherein said means for adjusting comprise end holes in said guide rail means, a series of opposed holes in said frame, and fastener means insertable through said guide rail end holes and into selected opposed frame holes.

4. An inspection station according to claim 1 wherein said guide rails provide horizontal surfaces on which the photomask rests and lateral edge surfaces for closely positioning lateral edge surfaces of the photomask therebetween.

5. An inspection station according to claim 1 wherein said stop means comprises a series of threaded openings extending through said guide rail means, and threaded stops insertable into selected threaded openings.

6. A photomask inspection station comprising
a microscope having an objective,
a stage positioned below the microscope objective having a first stationary plate, a second plate having a viewable area and means mounting said second plate on said first plate for shifting in one direction relative to said first plate, and a frame surrounding said viewable area and means mounting said frame on said second plate for shifting in a second perpendicular direction,
means for operating said shifting means to move said second plate and said frame relative to said first plate,
said frame having side beams and end beams that have a series of opposed holes,
a pair of parallel guide rails each having a pair of end holes alignable with a selected pair of opposed end beam holes, a surface for supporting a rectangular photomask, and a lateral edge for positioning a lateral edge of the photomask therealong,
fastener means insertable through said end holes and into said opposed frame holes for positioning said rails apart according to the width of the photomask,
stop means associated with said guide rails for positioning the end edges of the photomask therebetween, and
means for adjusting the relative spacing of said stop means.

7. An inspection station according to claim 6 wherein said means for adjusting comprises a series of threaded openings extending through said guide rail means, and threaded stops insertable into selected threaded openings.

* * * * *